July 16, 1957
R. H. DORSEY
2,799,244
COLLAPSIBLE BIRD CAGE
Filed Nov. 21, 1955
2 Sheets-Sheet 1
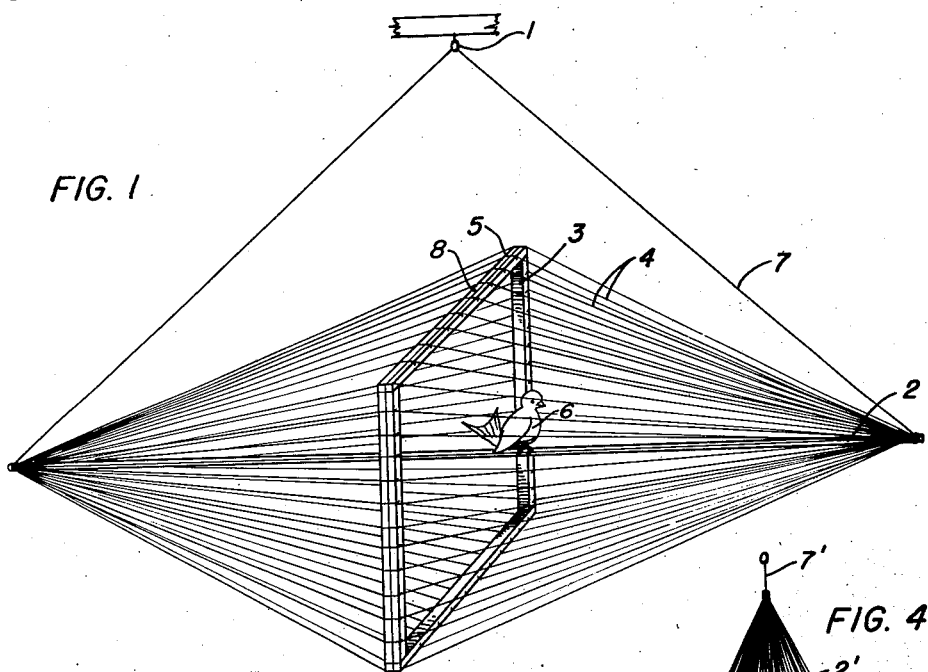
FIG. 1
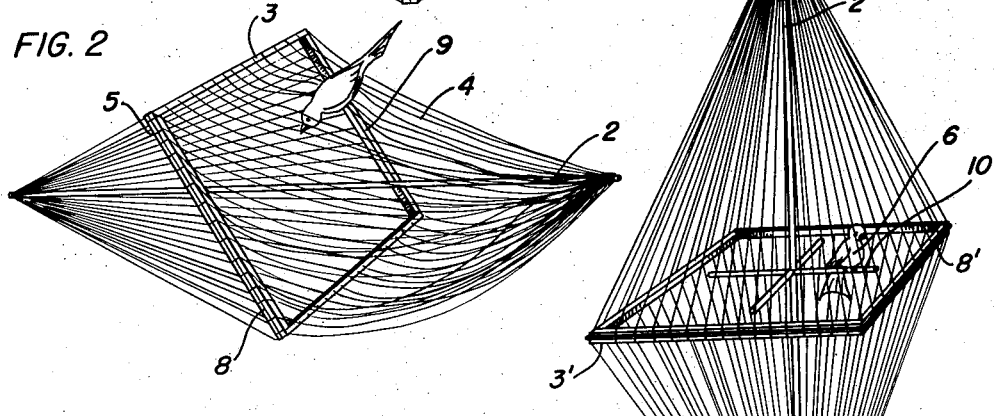
FIG. 2
FIG. 4
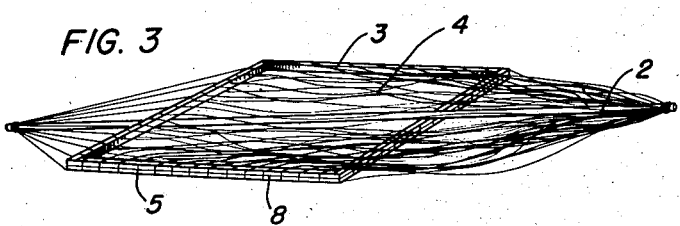
FIG. 3
INVENTOR.
RICHARD H. DORSEY
BY
ATTORNEY

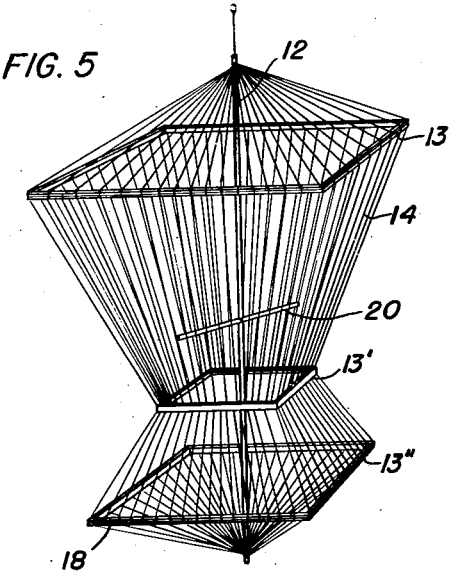
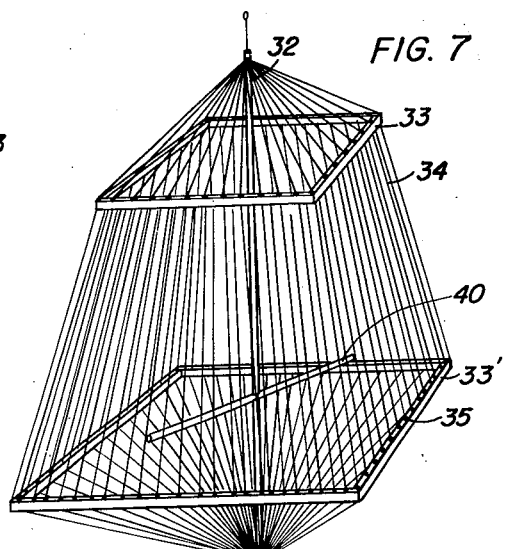
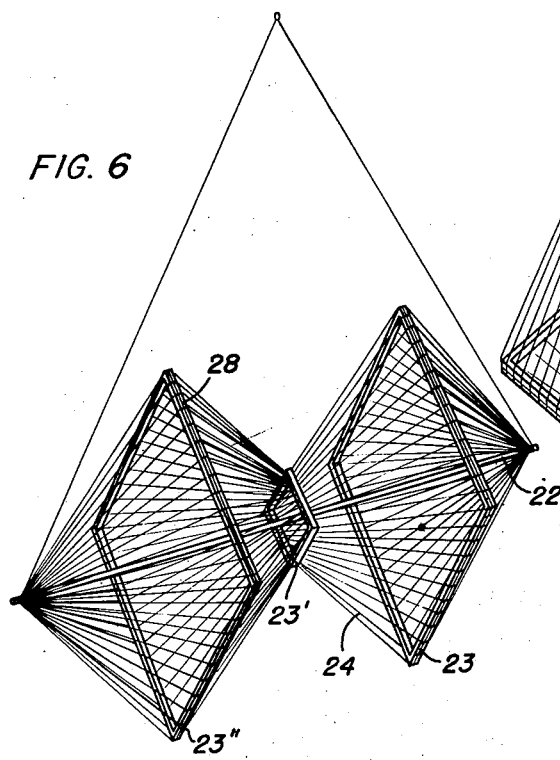
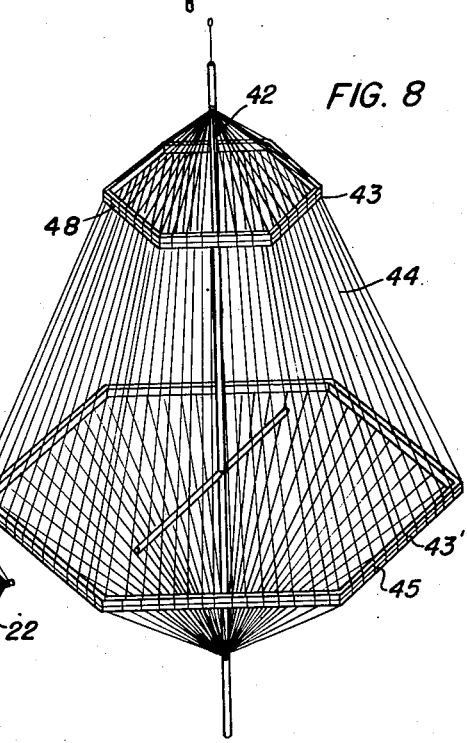

United States Patent Office 2,799,244
Patented July 16, 1957

2,799,244
COLLAPSIBLE BIRD CAGE

Richard H. Dorsey, New London, Wis.

Application November 21, 1955, Serial No. 548,073

4 Claims. (Cl. 119—17)

This invention relates to a cage for confining small animals and more particularly small avian animals and more particularly to a portable collapsible confining device for small birds.

Heretofore there has not been available a small lightweight inexpensive enclosure for transporting birds from one place to another and it has been necessary to use bulky wire cages and like devices.

My invention overcomes these disadvantages by providing a light-weight easily portable, easily collapsed bird cage with a minimum of parts and a minimum weight.

It is therefore an object of my invention to provide an improved bird cage.

Another object is a bird cage which is extremely light weight, which can be collapsed or folded into a nearly flat package utilizing a minimum of space for transportation when a bird is not enclosed therein.

Another object is a light-weight, collapsible, economical bird cage comprising a minimum of parts, wherein no door or closure member is provided and a bird may be confined within an area defined by a plurality of cords, strings or threads.

Further objects will become apparent from the drawings and the following detailed description in which it is my intention to illustrate the applicability of the invention without thereby limiting its scope to less than that of all those equivalents which will be apparent to one skilled in the art.

In the drawings, like reference numerals refer to like parts, and:

Figure 1 is a perspective view of one embodiment fully "set-up" and a bird contained therein;

Figure 2 is a perspective view in reduced scale of the embodiment of Figure 1 partially collapsed and a bird being inserted therein;

Figure 3 is a perspective view in reduced scale of the embodiment of Figure 1 fully collapsed;

Figure 4 is a perspective view of a modification of the embodiment of Figures 1 to 3;

Figure 5 is a perspective view of another embodiment;

Figure 6 is a perspective view of a modification of the embodiment of Figure 5;

Figure 7 is a perspective view of another embodiment;

Figure 8 is a perspective view of still another embodiment;

Referring now to Figures 1, 2 and 3 there is shown an embodiment wherein a stick, pole or rod 2 is provided with an encircling rigid frame member 3. A plurality of limp flexible members, which may be threads, strings or cords 4, are firmly affixed to the ends of rods 2 and extend through slots 5 in the periphery of member 3, to thereby maintain members in place and provide a cage.

Members 4 may be thread, string or cord, for example, cotton thread or cotton string has been found particularly suitable. However, any one of a number of other materials is quite suitable, for example, nylon fish line may be used, highly flexible braided or stranded wire such as the small diameter, extremely flexible wire used in electric shaver cords may be used. Generally speaking, preferred results are obtained with non-metallic threads, strings or lines. Materials adapted to kite lines and fish lines are particularly suitable.

The material of which rigid members 2 and 3 are made may be either wood or metal. Balsa wood has been used successfully as a material for member 3. Pine, spruce, and the like, are suitable for member 2. Metals, such as steel, brass or aluminum, or plastics, such as polystyrene, urea-formaldehyde resin or cellulose acetate may be used.

As shown in Figure 1, the cage is fully set up. A bird 6 is contained therein and the cage is supported in a hanging position by bridle 7 attached to the ends of rod 2 and supported from eyelet 1 which may be attached to any suitable beam or other support. As shown in Figure 1, encircling member 3 is supported midway between the points of attachment of members 4 to rod 2, symmetrically with respect to rod 2, in a plane perpendicular to the axis thereof, the support and positioning being provided only by members 4.

As shown in Figure 2, member 3 may be rotated with respect to the plane in which it lies in the fully set-up position of Figure 1. When rotated as in Figure 2, members 4 are caused to slide through slots 5 in the edge thereof and to slacken. When slackened they may be spread apart as at 9 and bird 6 may be inserted into, or withdrawn from the interior thereof through the aperture thus made.

As shown in Figure 3, member 3 may be further rotated, causing members 4 to further slacken, until it lies nearly in the plane of rod 2, thus providing a configuration occupying a minimum space particularly suitable for transporting the cage when a bird is not enclosed therein.

As shown in Figure 4, central rod 2′ may be provided with rigid members 10 adapted to serve as perches for bird 6 and may be supported with rod 2′ in a vertical position by means of a vertically-extending supporting string or cord 7′ attached at or near one end of rod 2.

Referring now to Figure 5 there is shown another embodiment wherein there are provided three members 13, 13′ and 13″ encircling central rod 12 and held in place by strings 14. The cage may be hung vertically as shown and the bird may sit on perch 20. The device may be partially collapsed for insertion of a bird or fully collapsed for transportation in a manner similar to that of the embodiment of Figures 1 to 3.

As shown in Figure 6, a modification of the embodiment of Figure 5 may be hung horizontally and may be made symmetrical with two large encircling members 23 and 23″ of equal size having a small encircling member 23′ disposed therebetween, all of said encircling members encircling rod 22 and held in place solely by strings 24 attached at or near the ends of rod 22 and slidably engaged with holes or slots in the perimeter of members 23, 23′ and 23″.

Referring now to Figure 7 there is shown another embodiment wherein two encircling members, 33 and 33′ are held in place encircling central rod 32 by lines or strings 34 attached at or near the ends of rod 32, the lines 24 being slidably and frictionally engaged with members 33 and 33′ by reason of passing through holes 35 therein. The desired frictional engagement may be accomplished by internally coating holes 35 with a thin layer of rubber or elastomeric synthetic resin or like material. A perch 40 is provided extending outwardly, perpendicular to central rod 32.

As shown in Figure 8, in another embodiment, encircling members 43 and 43′ are held in position encircling central rod 42 by threads 44 attached to rod 42 near the ends thereof, the members 44 being frictionally slidably engaged with slots 45 therein; slots 45 may be internally coated with an elastomer or may have a strip of elastomer inserted therein to provide the necessary friction, rubber being suitable as an elastomer for this purpose.

It may be noted that although the strings or cords in each of the embodiments are limp flexible members, they are tensioned when all encircling members are in the fully setup position as shown in Figures 1 and 4, for example, for a single encircling member.

In the embodiment of Figures 1 and 3 and the modification of Figure 4 members 4 are held in place slidably within slots 55 by members 8 and 8' which may be a string or cord, a wire, or a small wooden stick. String 8 may be attached to member 3 by means of adhesive and small wooden stick 8' may be similarly attached to member 3'. Similarly, in Figures 5, 6 and 8 members 14, 24 and 44 are held in place in slots 13, 25 and 45 respectively by members 18, 28 and 48 which may be adhesively attached to members 13, 13'', 23, 23'' 43 and 43''.

It may thus be seen that the invention is broad in scope and is not to be limted excepting by the claims herein.

Having thus disclosed my invention, I claim:

1. In a device adapted to contain and confine a bird, a central rigid rod member, a rigid member encircling said rod member and spaced apart therefrom a plurality of tensioned limp flexible members attached to said rod member at points spaced apart thereon, said flexible members being slidably attached to said encircling member at the periphery thereof and said encircling member being held in position encircling said rod member and spaced between said points of attachment only by the action of said flexible members.

2. The device of claim 1 further characterized by said encircling member being adapted to be rotated with respect to an axis perpendicular to said rod member while remaining slidably attached to said flexible members.

3. In a device adapted to contain and confine a bird, a central rigid rod member, a plurality of rigid members encircling said rod member and spaced apart therefrom, a plurality of tensioned limp flexible members attached to said rod member at points spaced apart thereon, said flexible members being slidably attached to each of said encircling members at the peripheries thereof and said encircling members being held in position encircling said rod member and spaced between said points of attachment only by the action of said flexible members.

4. The device of claim 3 further characterized by said encircling member being adapted to be rotated with respect to an axis perpendicular to said rod member while remaining slidably attached to said flexible members.

References Cited in the file of this patent

UNITED STATES PATENTS

| | | |
|---|---|---|
| 197,427 | Taft | Nov. 20, 1877 |
| 2,614,838 | Taylor | Oct. 21, 1952 |